(12) United States Patent
Tullman (10) Patent No.: US 11,726,478 B2
(45) Date of Patent: Aug. 15, 2023

(54) SYSTEMS AND METHODS FOR AUTONOMOUS MARKING MAINTENANCE

(71) Applicant: USIC, LLC, Indianapolis, IN (US)

(72) Inventor: Robert Tullman, Indianapolis, IN (US)

(73) Assignee: USIC, LLC, Indianapolis, IN (US)

(*) Notice: Subject to any disclaimer, the term of this patent is extended or adjusted under 35 U.S.C. 154(b) by 121 days.

(21) Appl. No.: 16/674,767

(22) Filed: Nov. 5, 2019

(65) Prior Publication Data

US 2020/0143141 A1 May 7, 2020

Related U.S. Application Data

(60) Provisional application No. 62/755,883, filed on Nov. 5, 2018, provisional application No. 62/755,887, filed
(Continued)

(51) Int. Cl.
*G05D 1/00* (2006.01)
*G05D 1/02* (2020.01)
(Continued)

(52) U.S. Cl.
CPC ......... *G05D 1/0094* (2013.01); *B64C 39/024* (2013.01); *B64D 1/18* (2013.01);
(Continued)

(58) Field of Classification Search
CPC .................................................. G05D 1/0094
See application file for complete search history.

(56) References Cited

U.S. PATENT DOCUMENTS

| 5,883,815 A | 3/1999 | Drakulich |
| 7,739,899 B1 | 6/2010 | Holland et al. |
(Continued)

FOREIGN PATENT DOCUMENTS

| DE | 2015 008068 B4 * | 10/2015 | |
| DE | 102015008086 A1 * | 12/2016 | ........... B05B 13/005 |
(Continued)

OTHER PUBLICATIONS

Machine Translation of Korean Patent Application Pub. No. KR101786494B1 that was filed in 2017 (downloaded Mar. 7, 2022).*
(Continued)

*Primary Examiner* — Jean Paul Cass
(74) *Attorney, Agent, or Firm* — Burns & Levinson LLP; Christopher Carroll (57) ABSTRACT

A marking maintenance system comprising a marking database, a drone, and a data network communicatively coupled to the marking database and drone. The marking database is arranged to store marking data associated with one or more markings. The marking data can include one or more marking locations within a geographic area and a type of infrastructure associated with each of the one or more marking. The drone is arranged to determine the location of the drone via one or more location sensors, receive data from the marking database, and deploy to each marking location within a portion of the geographic area. The drone is also arranged to determine whether each marking within the portion of the geographic area is sufficiently present using one or more marker sensors and repair each marking within the portion of the geographic area that is determined to not be sufficiently present.

20 Claims, 9 Drawing Sheets

Related U.S. Application Data on Nov. 5, 2018, provisional application No. 62/755,876, filed on Nov. 5, 2018.

(51) Int. Cl.

| | |
|---|---|
| *G05D 1/10* | (2006.01) |
| *B64C 39/02* | (2023.01) |
| *B64D 47/08* | (2006.01) |
| *B64D 9/00* | (2006.01) |
| *B64D 1/18* | (2006.01) |
| *H04W 4/40* | (2018.01) |
| *G01V 15/00* | (2006.01) |
| *H04W 4/38* | (2018.01) |
| *H04W 4/029* | (2018.01) |
| *G06F 16/28* | (2019.01) |
| *G06F 16/29* | (2019.01) |
| *G08G 5/00* | (2006.01) |
| *G06V 20/13* | (2022.01) |
| *G06V 20/17* | (2022.01) |
| *H04W 84/18* | (2009.01) |
| *B64U 10/13* | (2023.01) |
| *B64U 101/00* | (2023.01) |
| *B64U 101/30* | (2023.01) |

(52) U.S. Cl.
CPC .............. *B64D 9/00* (2013.01); *B64D 47/08* (2013.01); *G01V 15/00* (2013.01); *G05D 1/0088* (2013.01); *G05D 1/0276* (2013.01); *G05D 1/101* (2013.01); *G06F 16/285* (2019.01); *G06F 16/29* (2019.01); *G06V 20/13* (2022.01); *G06V 20/17* (2022.01); *G08G 5/0069* (2013.01); *H04W 4/029* (2018.02); *H04W 4/38* (2018.02); *H04W 4/40* (2018.02); *B64U 10/13* (2023.01); *B64U 2101/00* (2023.01); *B64U 2101/30* (2023.01); *B64U 2201/10* (2023.01); *B64U 2201/104* (2023.01); *B64U 2201/20* (2023.01); *H04W 84/18* (2013.01)

(56) References Cited

U.S. PATENT DOCUMENTS

| | | | |
|---|---|---|---|
| 9,542,863 | B2 | 1/2017 | Nielsen et al. |
| 9,702,830 | B1* | 7/2017 | Akselrod ............... H04L 67/12 |
| 9,776,200 | B2* | 10/2017 | Busby ................... B05B 9/0403 |
| 10,831,199 | B2 | 11/2020 | Anderson |
| 10,841,744 | B2 | 11/2020 | Patil et al. |
| 10,866,597 | B1 | 12/2020 | Reinhold et al. |
| 11,059,582 | B2 | 7/2021 | Nahuel-Andrejuk et al. |
| 11,125,910 | B2 | 9/2021 | Starr et al. |
| 11,263,538 | B1* | 3/2022 | Minarovic ............... G06N 3/08 |
| 11,265,538 | B2* | 3/2022 | Esenlik ............. H04N 19/1887 |
| 2007/0042123 | A1* | 2/2007 | Endregaard ......... B05B 13/0452 118/313 |
| 2008/0218170 | A1 | 9/2008 | Stolarczyk et al. |
| 2009/0040093 | A1 | 2/2009 | Holly et al. |
| 2009/0167308 | A1 | 7/2009 | Lomes |
| 2010/0019464 | A1 | 8/2010 | Miller |
| 2011/0063767 | A1 | 3/2011 | Kasz et al. |
| 2012/0210853 | A1 | 8/2012 | Abershitz et al. |
| 2012/0229321 | A1 | 9/2012 | Holly et al. |
| 2013/0265138 | A1 | 10/2013 | Nielsen et al. |
| 2014/0297225 | A1 | 10/2014 | Petroski |
| 2015/0330911 | A1 | 11/2015 | Howard |
| 2016/0350907 | A1 | 12/2016 | Simula et al. |
| 2017/0031369 | A1 | 2/2017 | Liu et al. |
| 2017/0102467 | A1 | 4/2017 | Nielsen et al. |
| 2017/0108609 | A1 | 4/2017 | Haddy |
| 2017/0323129 | A1 | 11/2017 | Davidson et al. |
| 2017/0363764 | A1 | 12/2017 | Aldridge et al. |
| 2018/0156614 | A1 | 6/2018 | Michini et al. |
| 2018/0196135 | A1 | 7/2018 | Crain et al. |
| 2018/0259652 | A1 | 9/2018 | Shimizu et al. |
| 2018/0306923 | A1 | 10/2018 | Porcel Magnusson |
| 2019/0087635 | A1 | 3/2019 | Klaus |
| 2019/0187724 | A1 | 6/2019 | Li et al. |
| 2019/0259150 | A1 | 8/2019 | High et al. |
| 2019/0317239 | A1* | 10/2019 | Olsson ..................... G01V 3/12 |
| 2019/0354742 | A1 | 11/2019 | Murakoshi |
| 2020/0012829 | A1* | 1/2020 | Davidson ........ G06K 19/06037 |
| 2020/0065605 | A1 | 2/2020 | Manako et al. |
| 2020/0066142 | A1 | 2/2020 | Fowe et al. |
| 2020/0072624 | A1 | 3/2020 | Kuzmanovic |
| 2020/0111222 | A1 | 4/2020 | Asmari et al. |
| 2020/0115050 | A1 | 4/2020 | Murakoshi |
| 2020/0158910 | A1 | 5/2020 | Tietsworth et al. |
| 2021/0013705 | A1 | 1/2021 | Miron et al. |
| 2021/0061465 | A1 | 3/2021 | Kaneda |
| 2021/0231518 | A1 | 7/2021 | Pawlyk |
| 2021/0278314 | A1 | 9/2021 | Xia et al. |
| 2021/0284335 | A1 | 9/2021 | McLaughlin et al. |
| 2021/0309352 | A1 | 10/2021 | Elkins |
| 2021/0391653 | A1 | 12/2021 | Berg |
| 2021/0405244 | A1 | 12/2021 | Starr et al. |

FOREIGN PATENT DOCUMENTS

| | | | | |
|---|---|---|---|---|
| DE | 102018121401 | A1 * | 3/2020 | .......... B64C 39/024 |
| EP | 2805229 | B1 * | 5/2020 | ............. B60R 11/00 |

OTHER PUBLICATIONS

International Search Report and Written Opinion dated Jan. 16, 2020, Application No. PCT/US2019/059863 (19 pages).
International Search Report and Written Opinion dated Jan. 21, 2020, Application No. PCT/US2019/059858 (19 pages).
International Search Report and Written Opinion dated Jan. 21, 2020, Application No. PCT/US2019/059862 (20 pages).

* cited by examiner

SYSTEMS AND METHODS FOR AUTONOMOUS MARKING MAINTENANCE

REFERENCE TO RELATED APPLICATIONS

This application claims priority to and the benefit of: U.S. Provisional Patent Application No. 62/755,876, filed on Nov. 5, 2018, and entitled "Systems and Methods for an Autonomous Marking Apparatus"; U.S. Provisional Patent Application No. 62/755,883, filed on Nov. 5, 2018, and entitled "Systems and Methods for Autonomous Marking Maintenance"; and U.S. Provisional Patent Application No. 62/755,887, filed on Nov. 5, 2018, and entitled "Systems and Methods for Autonomous Marking Identification." The entire contents of the above-referenced applications are incorporated herein by reference.

FIELD OF THE INVENTION

The invention relates generally to systems and methods for operating an autonomous apparatus. More particularly, in various aspects, the invention relates to locating and marking locations associated with underground infrastructure using an autonomous apparatus.

BACKGROUND

Often, public utility lines are run underground due to their function, to limit obstruction of other infrastructure, or for convenience. Examples of underground utility lines include electric power, natural gas, communications, potable water, reclaimed water, and wastewater, among others. As required by law and assigned by the U.S. Federal Communications Commission (FCC), the 8-1-1 telephone number is used as a hotline that allows developers and homeowners to contact utility companies, who will then denote where underground utilities are located using color-coded markings.

Typically, utility companies deploy contractors to detect and identify the location and depth of the utility lines using a utility locator tool. After detection and identification, the utility lines are marked with paint. Such a process is considered labor-intensive and inefficient, often requiring extensive amounts of man-hours of work. Accordingly, there is a need to enable more efficient utility detection and markings. Furthermore, the problem is exacerbated when utility lines need to be marked across a large area (e.g., along a highway) where traditional human marking of the utility lines can be onerous. Hence, there is a long felt need to address the challenges of marking utility lines across a vast area in a more efficient manner. Another problem with utility markings is that such markings may be obscured, covered, or removed during a construction project, requiring contractors to perform multiple surveys of an area that often leads to costly re-identification and re-marking of utility lines. Accordingly, there is also a need enable more efficient and reliable tracking, monitoring, and re-marking of utility lines.

SUMMARY OF INVENTION

The present disclosure describes systems, methods, and devices that enable more efficient identification and marking of certain infrastructure, including underground utilities. In certain aspects, an aerial drone or robot may be deployed within a geographic area or worksite to scan and detect the markings associated with underground infrastructure. The drone may operate autonomously, under the control of a user, or cooperatively with a contractor as the contractor detects and marks the location of certain underground infrastructure. In some aspects, the drone may include detection equipment that enables the drone to autonomously detect certain underground infrastructure. The detection equipment include a depth sensor (e.g., a sonar and/or electromagnetic detector) configured to determine the depth of underground infrastructure. The drone may include a payload of marking material and a delivery mechanism to deliver markings to a surface. The delivery mechanism may include a spray head arranged to deliver a marking material such as paint to a surface at a location corresponding to an infrastructure component. The drone may include a computer processor and navigation system that enables the drone to move to a location or set of locations corresponding to underground infrastructure and/or markings. The drone may include one or more marking sensors that enable the drone to sense and/or detect the present of one or more markings within the vicinity of the drone. The drone may include a communications system that enables the drone to exchange data, including marking identification and/or location data with a remotely located server and/or marking database. The drone may utilize marking location data stored within the marking database to enable the drone to navigate to one or more marking locations within a worksite or geographic area. The drone may be configured to recognize marking at one or more locations and transmit such marking identification and/or location data to the markings database. A drone may be configured to store a portion of the marking databased within its memory and/or local data store.

In one aspect, the present application discloses a marking maintenance system including a marking database, a drone, and a data network communicatively coupled to the marking database and drone. The marking database is arranged to store marking data associated with one or more markings. The marking data includes one or more marking locations within a geographic area and a type of infrastructure associated with each of the one or more marking. The drone is arranged to determine the location of the drone via one or more location sensors and receive first data from the marking database. The first data includes marking data associated with a portion of the geographic area. The drone is also arranged to deploy to each marking location within the portion of the geographic area and determine whether each marking within the portion of the geographic area is sufficiently present using one or more marker sensors. The drone can determine whether each marking within the portion of the geographic area is sufficiently present by detecting an indicator in paint associated with each of the detected markings. The drone is also arranged to repair each marking within the portion of the geographic area that is determined to not be sufficiently present and transmit second data to the marking database. The second data indicates each of the markings within the portion of the geographic area that has been repaired. The drone may be arranged to control the delivery of the payload at a location of the underground infrastructure and or a damaged or missing marking based, in part, on the apparatus location data and underground infrastructure data. For example, the drone may continuously compare its location with the location of an underground infrastructure element and/or marking in underground infrastructure data while the drone is moving. The drone may continuously compare the difference in, for example, GPS coordinates of the drone with the target underground infrastructure or marking GPS coordinates, and control its propulsion system so as to navigate the drone and/or marking apparatus to the GPS coordinates of the designated underground infrastructure or marking. Once at the target location, the drone may repair, replace, and/or add the marking above the underground infrastructure if further marking is determine to be required.

In some implementations, the drone is configured to determine that a marking is not sufficiently present by determining that a threshold portion of the marking previously set is not present. In certain implementations, the threshold portion may be one of greater than or equal to 10, 20, 30, 40, 50, 60, 70, 75, 80, 90, and 100 percent.

In some implementations, the drone is configured to determine that a marking is not sufficiently present by determining that a particular segment of the marking previously set is not present. In certain implementations, the drone cam determine that a marking is not sufficiently present by determining that an incorrect indicator is present. The drone may include a camera and capture at least one image of a marking within the portion of the geographic area.

According to some implementations, repairing includes replacing the marking. Repairing may include overlaying a portion of the previously set marking including a portion that is currently not present. In certain implementations, repairing includes applying a replacement marking over the previously set marking. Repairing may include applying a marking at a location that was not previously applied.

In some implementations, the drone includes a data store that stores a portion of the marking database. The marking database may be located remotely from the drone. The drone may receive first data from and send second data to the marking database via a remote server. In some implementations, the drone sends data to the marking database periodically, in real-time, in near real-time, and/or in response to a query from the remote server.

In some implementations, the indicator includes at least one of a pigment, a radioactive material, light sensitive material, and a chemically reactive material. The drone may include a data store configured to store an infrastructure table correlating each unique signature and/or reference indicator with a type of infrastructure. In some implementations, the marking database includes an infrastructure table correlating each reference indicator with a type of infrastructure. The drone may determine the type of infrastructure associated with a detected marking by comparing the detected indicator with the infrastructure table to identify a match between a reference indicator and the detected indicator.

In certain implementations, the drone is unmanned aerial vehicle (UAV) or autonomous aerial vehicle (AAV). The marking database may be located in the drone, at a drone-deploying vehicle, in a remote regional location, and/or at a headquarters location.

In another aspect, an autonomous marking maintenance apparatus includes a transceiver communicatively coupled to a data network. The transceiver is arranged to receive first data from a marking database where the first data includes marking data associated with a portion of a geographic area. The marking database may be arranged to store marking data associated with one or more markings where the marking data includes one or more marking locations within the geographic area and includes a type of infrastructure associated with each of the one or more marking. The apparatus also includes a location sensor arranged to determine a location of the apparatus and a propulsion system arranged to enable the apparatus to deploy to each marking location within the portion of the geographic area. The apparatus may include one or more marking sensors arranged to scan an area in proximity to the apparatus. The apparatus may also include a processor arranged to i) determine whether each marking within the portion of the geographic area is sufficiently present based on sensor data received from the one or more marking sensors, wherein determining includes detecting an indicator in paint associated with each of the detected markings; ii) control repair of each marking within the portion of the geographic area that is determined to not be sufficiently present; and iii) coordinate with the transceiver to transmit second data to the marking database, wherein the second data indicates each of the markings within the portion of the geographic area that has been repaired.

A further aspect includes a method of performing marking maintenance by providing a marking database arranged to store marking data associated with one or more markings where the marking data includes one or more marking locations within a geographic area and includes a type of infrastructure associated with each of the one or more marking, the marking database communicatively coupled to a data network. The method also includes: communicatively coupling a drone to the data network; determining a location of the drone via one or more location sensors; receiving first data from the marking database, where the first data includes marking data associated with a portion of the geographic area; deploying the drone to each marking location within the portion of the geographic area; determining whether each marking within the portion of the geographic area is sufficiently present using one or more marker sensors, where determining includes detecting an indicator in paint associated with each of the detected markings; repairing each marking within the portion of the geographic area that is determined to not be sufficiently present; and transmitting second data to the marking database, where the second data indicates each of the markings within the portion of the geographic area that has been repaired.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

The systems, methods, and devices described herein provide an autonomous marking system for the identification and application of utility markings within a geographic area. The autonomous marking system includes a location sensor, a payload assembly, one or more marking sensors, a transceiver, a data store, and a processor. The location sensor is used to determine the location of the apparatus. The payload assembly is used to carry a payload of marking material. For example, the payload assembly can carry a container of paint for marking the utility lines. The one or more marking sensors are used to scan an area in proximity to the apparatus so that the apparatus can identify the utility markings. For example, one of the marking sensors can be an optical sensor that can identify paint and paint colors. The transceiver is used to exchange data with a remote server via a data network. The data store is used to store a portion of the data. The processor receives data from all of the sensors (e.g., the location sensor, the one or more marking sensors, and from the transceiver) and uses the data to control the delivery of the payload (e.g., paint) at the location of the apparatus.

Figure 1:
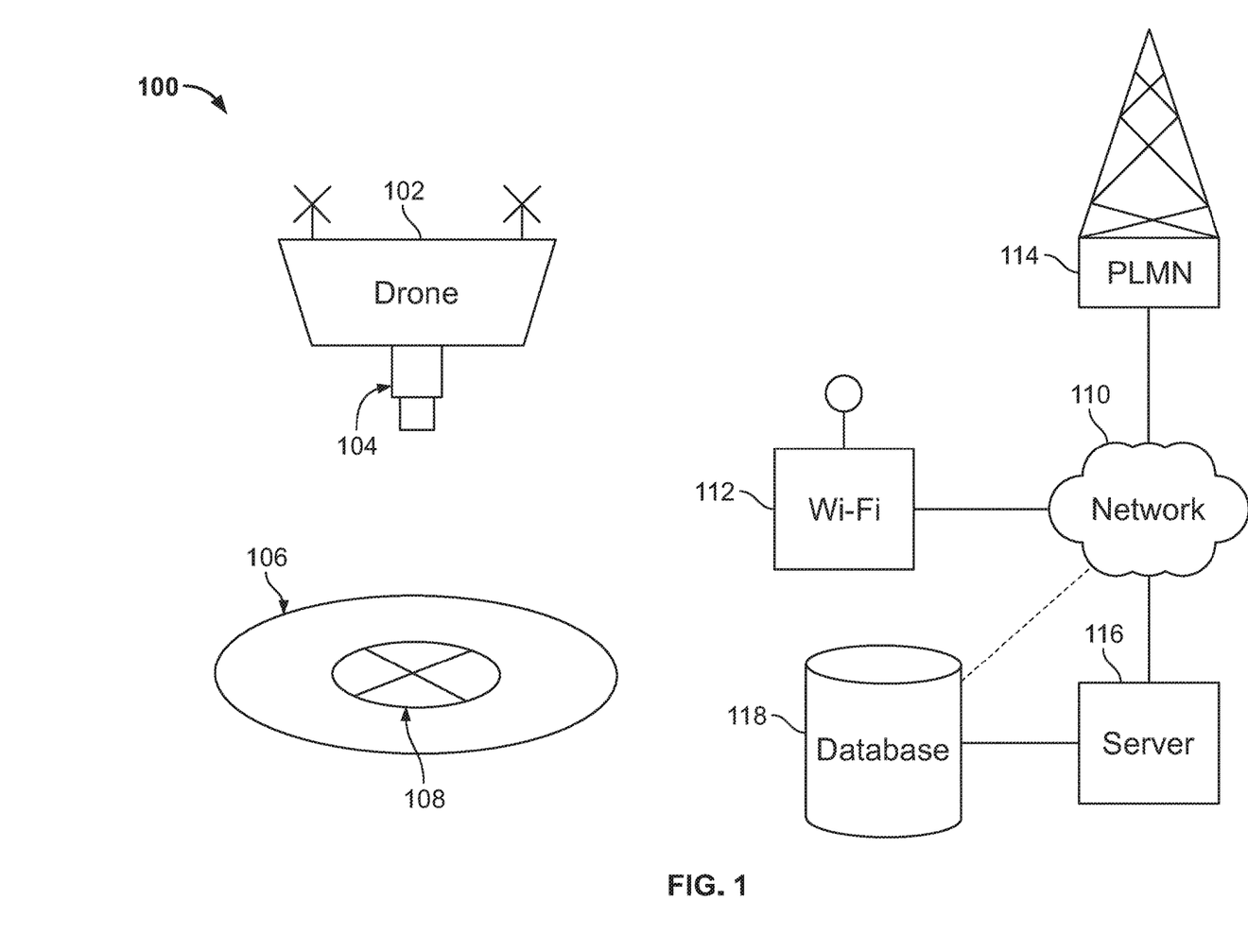
FIG. 1 shows a schematic representation of an autonomous marking system.

FIG. 1 shows a schematic representation of an autonomous marking system 100 comprising drone 102, network 110, Wi-Fi 112, public land mobile network (PLMN) 114, and server 116. Autonomous marking system 100 may include one or more drones 102, each drone 102 having a particular purpose. For example, one or more drones 102 may include sensors to identify utility lines and/or markings. Further, one or more drones 102 may include an applicator 104 (e.g., a spray nozzle) to mark the utility lines and/or markings identified by the same or another drone 102. Drone 102 is further described in the description of FIG. 2. As shown in FIG. 1, utility lines can be located at location 106 and identified by marking 108. Because utility lines are often several feet below the surface, markings 108 assist developers, utility workers, and homeowners in locating utility lines below the surface.

Network 110 represents a network of internet-based devices and connections such as servers, storage, and applications. Server 116 may be a server and the receiver of input data from drone 102, as well as data structures from network 110. Server 116 may also transmit signals and/or commands to drone 102. In one implementation, server 116 transmits signals to drone 102 to enable operation of applicator 104. Server 116 includes non-volatile storage that can maintain data for long periods of time and may comprise hard disks, optical disks, solid-state drives (SSDs), or another type of non-volatile memory. Server 116 may also include databases with accessible data structures that comprise information corresponding to locations of markings and utility lines. In one implementation, server 116 is communicatively coupled to external database 118 with accessible data structures that comprise information corresponding to locations of markings, types of markings, timestamps of marking creations, marking expiration data/time, and the like that correspond to certain infrastructure, such as utility lines. Server 116 may include a web server configured to receive inputs from entities using a user interface. Server 116 is further described in the description of FIG. 3, below. The database 118 may directly interface with server 116 and/or be included within a datastore of server 116. The database 118 may interface with server 116 and/or another other element of the marking system via data network 110. In some implementations, a portion of the data stored with datastore 118 may be stored within a memory and/or datastore of drone 102.

The communication between network 110 and drone 102 can be achieved using Wi-Fi 112 and/or PLMN 114. Wi-Fi 112 is implemented using a router that connects with drone 102 using a wireless local area network using IEEE 802.11 standards. Wi-Fi 112 may be located on or in a structure (e.g., a house or building) and allows drone 102 to communicate with network 110 within the range of the wireless local area network surrounding the structure. For example, drone 102 can be deployed from the roof of a building to location 106 if location 106 is within the range. In one implementation, Wi-Fi 112 may be located on a mobile structure (e.g., a van or truck) that allows drone 102 to communicate with network 110 within the range of the wireless local area network surrounding the mobile structure. For example, drone 102 can be deployed from a mobile structure that has been deployed near location 106. PLMN 114 is a wireless telecommunication system that allows drone 102 to communicate with network 110 from a larger range compared with Wi-Fi 112. In one aspect, PLMN 114 is implemented using a radio base station and radio transmitters and receivers. As described further below, drone 102 transmits and receives data from Wi-Fi 112 and/r PLMN 114 using an on-board transceiver.

Figure 2:
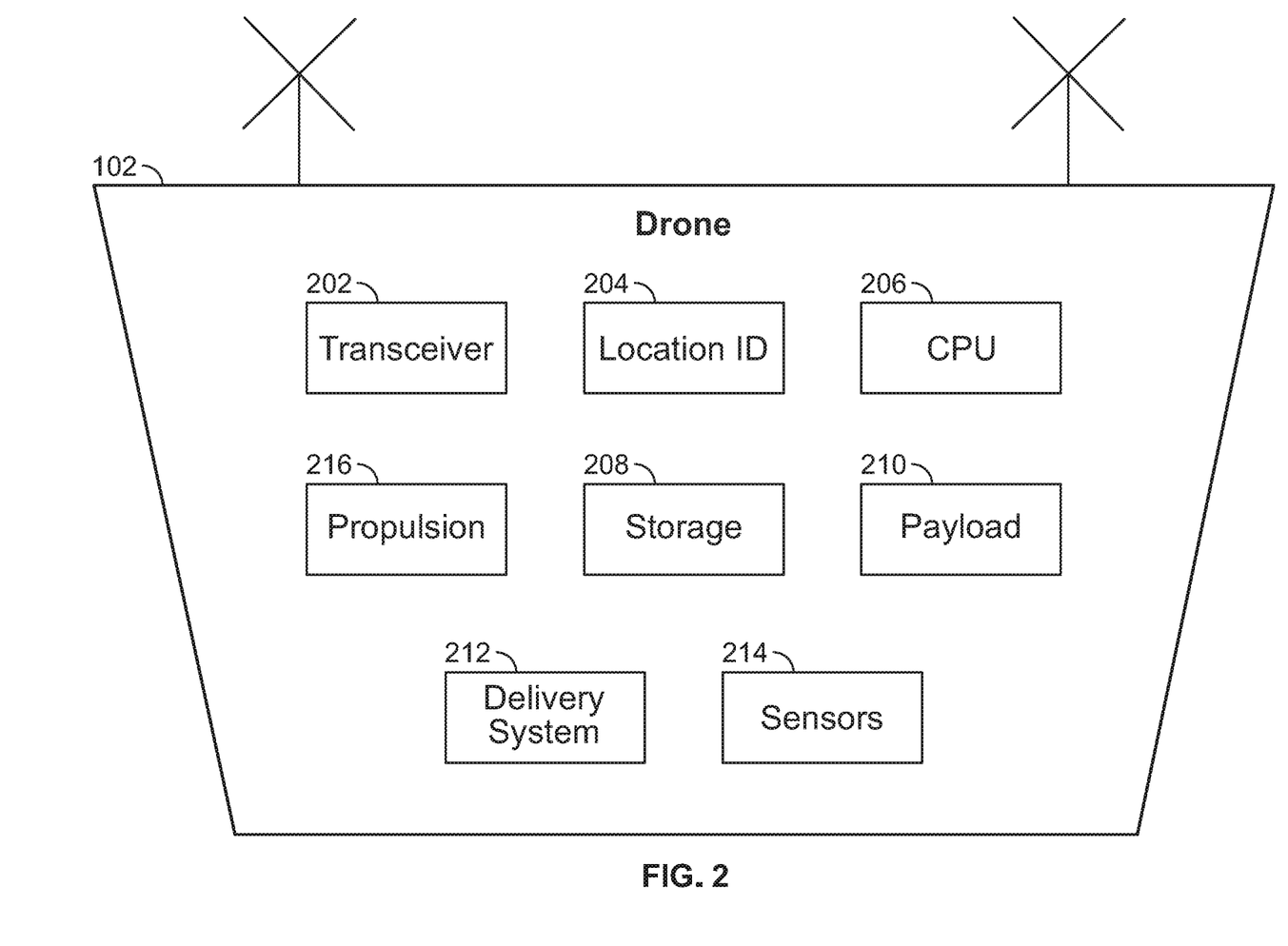
FIG. 2 shows a schematic representation of a drone of the autonomous marking system of FIG. 1.

FIG. 2 shows a schematic representation of a drone 102. Drone 102 comprises transceiver 202, location ID function 204, CPU (central processing unit) 206, storage 208, payload 210, and delivery system 212. Drone 102 may also include a memory unit (e.g., random-access memory), a display, speakers, a user input interface, and an output interface. CPU 206 may include a single microprocessor or multiple microprocessors. Storage 208 may be non-volatile storage that can maintain data for long period of time. Storage 208 may comprise hard disks, optical disks, SSDs, or another type of non-volatile memory.

Transceiver 202 may be a device having a transmitter and a receiver within a single housing or may include circuitry integrated within a server 116 and/or drone 102. Transceiver 202 is capable of transmitting and receiving radio signals. For example, transceiver 202 can transmit and receive data from Wi-Fi 112 and/or PLMN 114. CPU 206 may instruct transceiver 202 to receive data from network 110 and transmit data to network 110 via Wi-Fi 112 and/or PLMN 114. Location ID function 204 represents an identifier system that indicates the location of drone 102. For example, location ID function 204 may include a global positioning system (GPS) circuit or other navigational system using coordinates to keep track of the location of drone 102. Location ID function 204 may also keep track of the address of the nearest structure to use in combination with GPS coordinates. In one aspect, location ID function 204 may also include an accelerometer, telemetry sensor, radio-frequency sensor, and/or radio-frequency triangulation sensor.

Payload assembly 210 and delivery system 212 and/or applicator 104 enable drone 102 to identify utility markings (e.g., marking 108) and deploy a marking material on the utility markings. Payload assembly 210 may store material that is used to mark utility marking 108. In one implementations, the material in payload assembly 210 includes paint. Typically, utility lines are marked using paint along the length of the lines. The color of the paint identifies the type of utility that is being marked. For example, the American Public Works Association (APWA) has issued a uniform color code for marking underground utility lines. The APWA color code assigned red to electric power lines, yellow to gas lines, orange to communication lines, blue to potable water lines, and green to sewer lines, among others. In one implementation, payload assembly 210 is coupled to applicator 104 such that applicator 104 deploys the material in payload assembly 210 to a marking 108.

Delivery system 212 includes control circuitry to enable deployment of payload assembly 210. For example, CPU 206 may instruct delivery system 212 to open a hatch and/or valve of payload assembly 210, allowing the material of payload 210 to move into applicator 104. Delivery system 212 also includes one or more sensors 214 to identify markings and/or utility lines. The sensors 214 may include one or more of optical sensors, visible light sensors, cameras, infrared sensors, ultra violet sensors, radiation sensors, and/or ground-penetrating sensors. A ground-penetrating sensor may include a sonar, magnetic, and/or electromagnetic sensor. The one or more sensors 214 of delivery system 212 may be configured to scan an area in proximity to the drone 212. For example, the sensors 214 may sense colors and/or compounds in paint. As described above, the color of a marking or a compound in the paint of marking 108 may be used to identify the type of utility line that is underneath marking 108.

In one implementation, sensors 214 may sense colors optically by calculating the hue and saturation of RGB (red, green, and blue) pixels of an image. For example, sensor 214 may capture an image of the area surrounding marking 108. Sensors 214 can calculate the hue and saturation of RGB pixels of the image of the marking 108 and compare the calculations to stored hue and saturation values representing known colors.

In another aspect, sensors 214 may sense colors using infrared spectroscopy to identify pigments in paint. For example, sensor 214 may emit an optical signal having a wavelength in the infrared range and measure the reflectance of light from the paint of marking 108. The reflectance will be different based on the pigment in the paint of marking 108. Sensor 214 can identify the specific pigment by comparing the spectrum of the reflectance with stored spectra of known pigments in paint. Once the pigment has been identified, sensor 214 can determine the color of the paint that corresponds to the identified pigment. Examples of pigments (and their corresponding colors) include carbon (black), cobalt aluminate (blue), chromium oxide (green), titanium dioxide (white), cobalt phosphate (violet), cadmium sulfide (yellow), cadmium sulfoselenide (orange), and iron oxide (red). Other examples of pigments include antimony trioxide (white), zinc oxide (white), cobalt stannate (blue), lead chromate (yellow), zinc chromate (yellow), and cadmium selenide (red).

In yet another aspect, sensors 214 may sense colors using radioluminescence. Radioluminescent paint is a self-luminous paint that consists of a small amount of a radioactive isotope and a radioluminescent phosphor chemical. The radioisotope continually decays, emitting radiation particles which strike molecules of the phosphor, exciting them to emit visible light. Generally, radioluminescent paint uses tritium as the radioactive isotope, but other radioactive isotopes may be used. As discussed above, sensors 214 may include a radiation detector to detect the radiation emitted by the radioactive isotope. In one implementation, sensors 214 may use RGB optical sensing and/or infrared spectroscopy to identify the color of the radioluminescent paint.

In some implementations, the drone 102 includes a propulsion system 216 that is configured to enable the drone 216 to move from one location to another location. The propulsion system 216 may enable to drone to remain stationary or hover in a particular location. The propulsion system may include one or more propellers, stabilizers, wheels, tracks, thrusters, batteries, and combustible engines. The CPU and/or controller 206 may control the propulsion system 216 to direct the drone 102 to a particular location or locations. The controller 206 may control the propulsion system 216 while concurrently controlling other components of the drone 102. For example, to draw one or more lines and/or markings, the controller may change the position of the drone 102 while actuating the delivery system 212 to delivery marking material, i.e., spray a surface. The controller 206 may also concurrently receive location data from the Location ID function 204 continuously so as to direct the position of the drone 102 along a desired path and/or to a desired location while also marking a target path and/or area.

Figure 3:
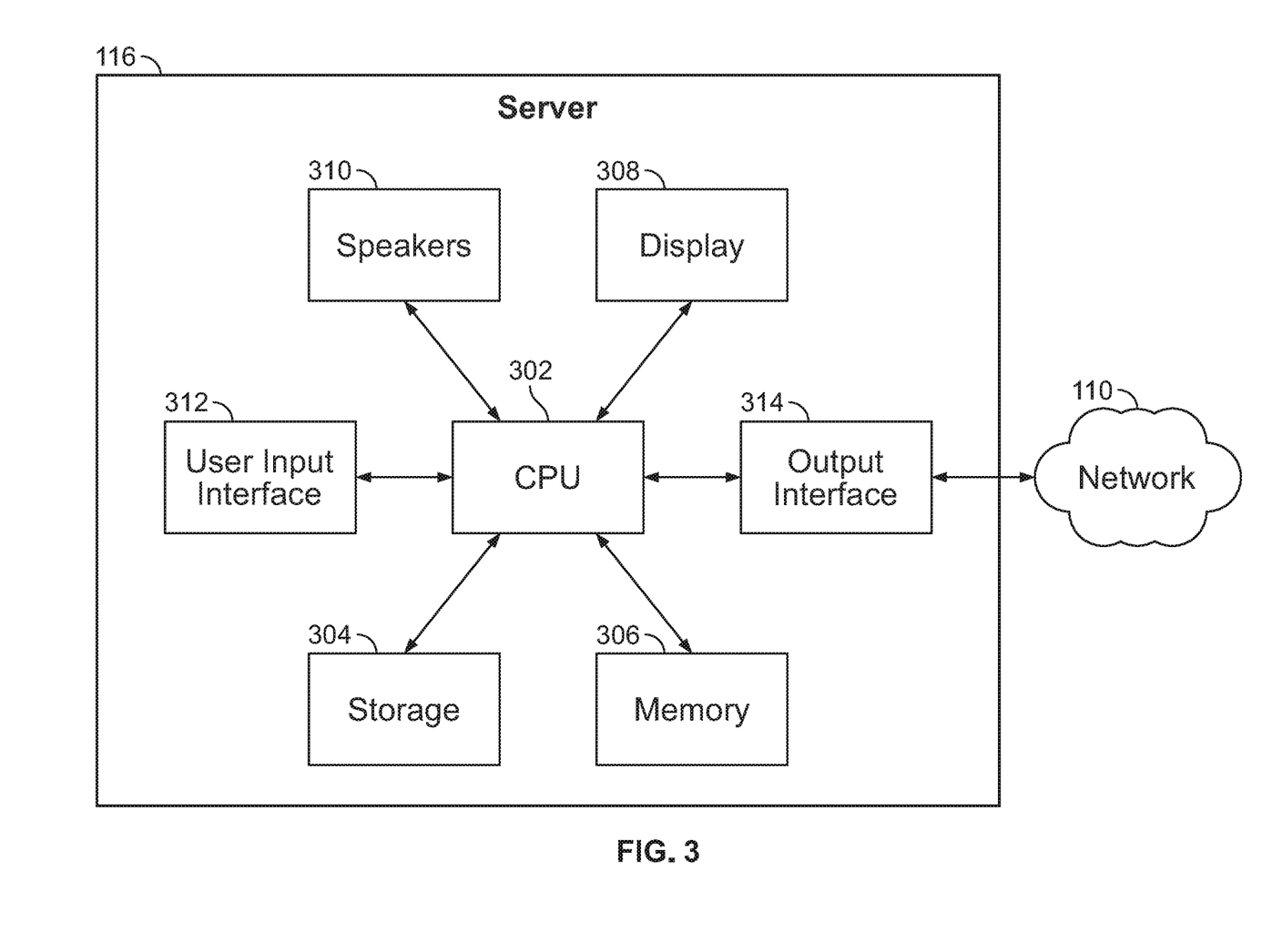
FIG. 3 shows a schematic representation of a server of the autonomous marking system of FIG. 1 interfacing with a network.

FIG. 3 shows a schematic representation of a system 300 including server 116 interfacing with network 110. In one aspect, system 300 also includes a Wi-Fi 112, PLMN 114, other wireless interface, and/or wired interface with network 110. In another aspect, system 300 also comprises database 118 interfacing with server 116. Server 116 comprises CPU 302, storage 304, memory 306, display 308, speakers 310, user input interface 312, and output interface 314. CPU 302 may include a single microprocessor or multiple microprocessors. Storage 304 may be non-volatile storage that can maintain data for long period of time. Storage 304 may comprise hard disks, optical disks, SSDs, or another type of non-volatile memory. Memory 306 may be volatile storage that can be accessed quickly. Memory 306 may comprise dynamic random-access memory (DRAM), static random-access memory (SRAM), or another type of high-speed volatile memory.

Display 308 may be provided as a stand-alone device or integrated with server 116 and may comprise one or more of a monitor, a television, a liquid crystal display (LCD) for a mobile device, or any other suitable equipment for displaying visual images. Speakers 308 may be any suitable equipment for playing audio. User input interface 312 may comprise a keyboard, a mouse, a touch screen display, or any other suitable equipment for user input. Output interface 314 may comprise any suitable data communication device that can interface with network 110. System 300 may include a web client such as, without limitation, Google Chrome, Internet Explorer, and the like. The network 110 may include the Internet, an intranet, private data network, wireless network, mobile data network, satellite network, and the like.

Utility companies deploy contractors to detect and identify the location 106 and depth of the utility lines using a utility locator tool. After detection and identification, the utility lines are marked with a marking (e.g., paint). However, when utility lines need to be marked across a large area (e.g., along a highway), traditional human marking of the utility lines can be onerous. Autonomous marking system 100 facilitates marking of utility lines by deploying drones 102 to identify and mark utility lines at a location 106.

Figure 4:
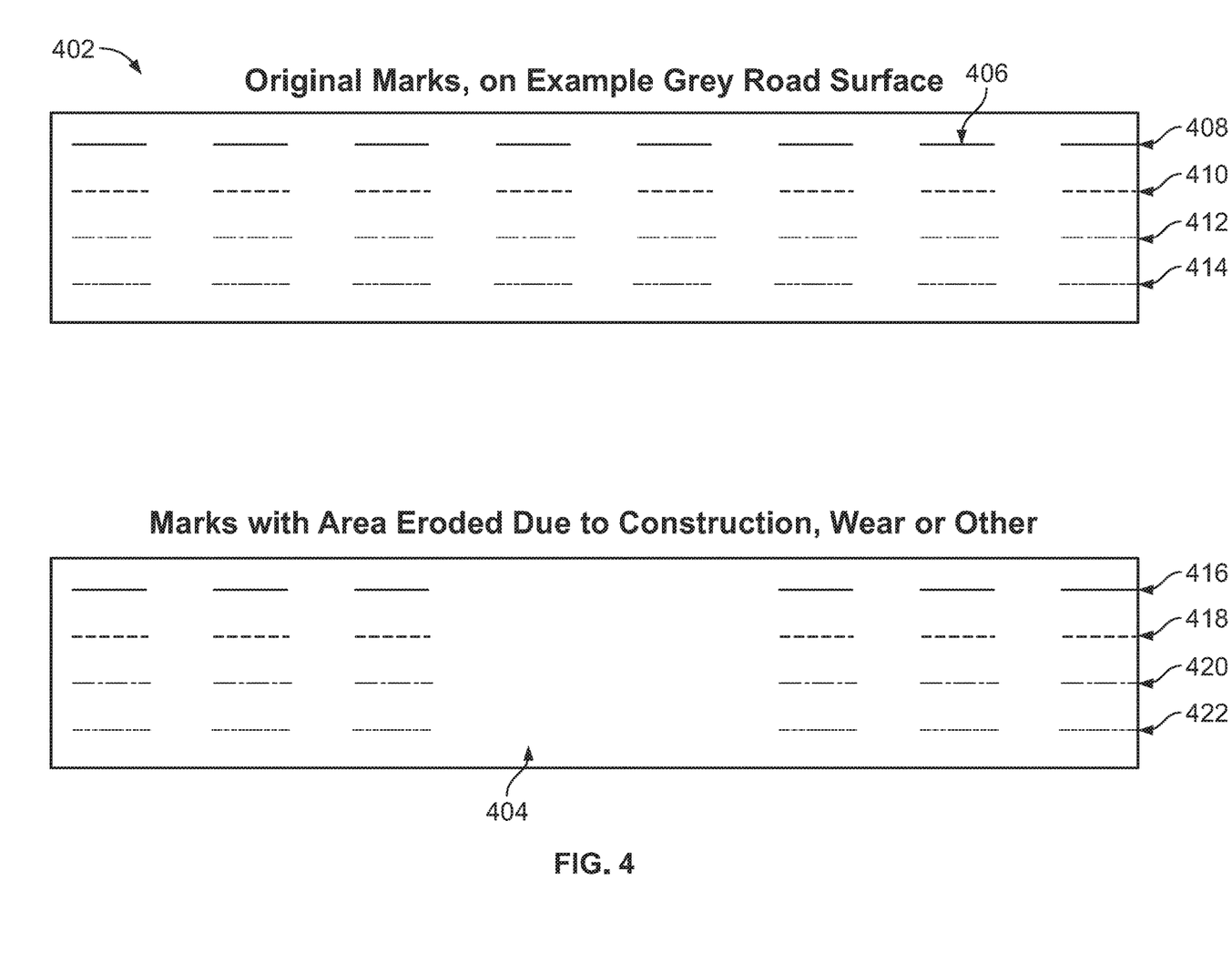
FIG. 4 shows a schematic representation of original and eroded markings on a surface road.

As shown in FIG. 4, a highway 402 has markings 406 that appear along various portions of highway 402. For the purpose of illustration, the markings are shown in rows 408-414 and 416-422 respectively before and after construction or other wear on the highway 402. The markings 406 may be marked using traditional human marking techniques. Over time, markings 406 may erode due to external factors (e.g., weather, construction, vehicle traffic, and human foot traffic). For example, highway 402 may have eroded portions 404 which correspond to areas of highway 402 where original markings 406 have eroded or completely disappeared. Autonomous marking system 100 can identify eroded portions 404 where markings 406 have eroded and apply paint or another marking material to maintain the markings 406. Although not shown, the marking in each row 408-422 have a different color corresponding to a different underground utility. Instead and for illustration purposes, the different color marking are represented using different types of solid or dashed lines. An example process for maintaining utility markings using autonomous marking system 100 is described below in relation to FIG. 5.

Figure 5:
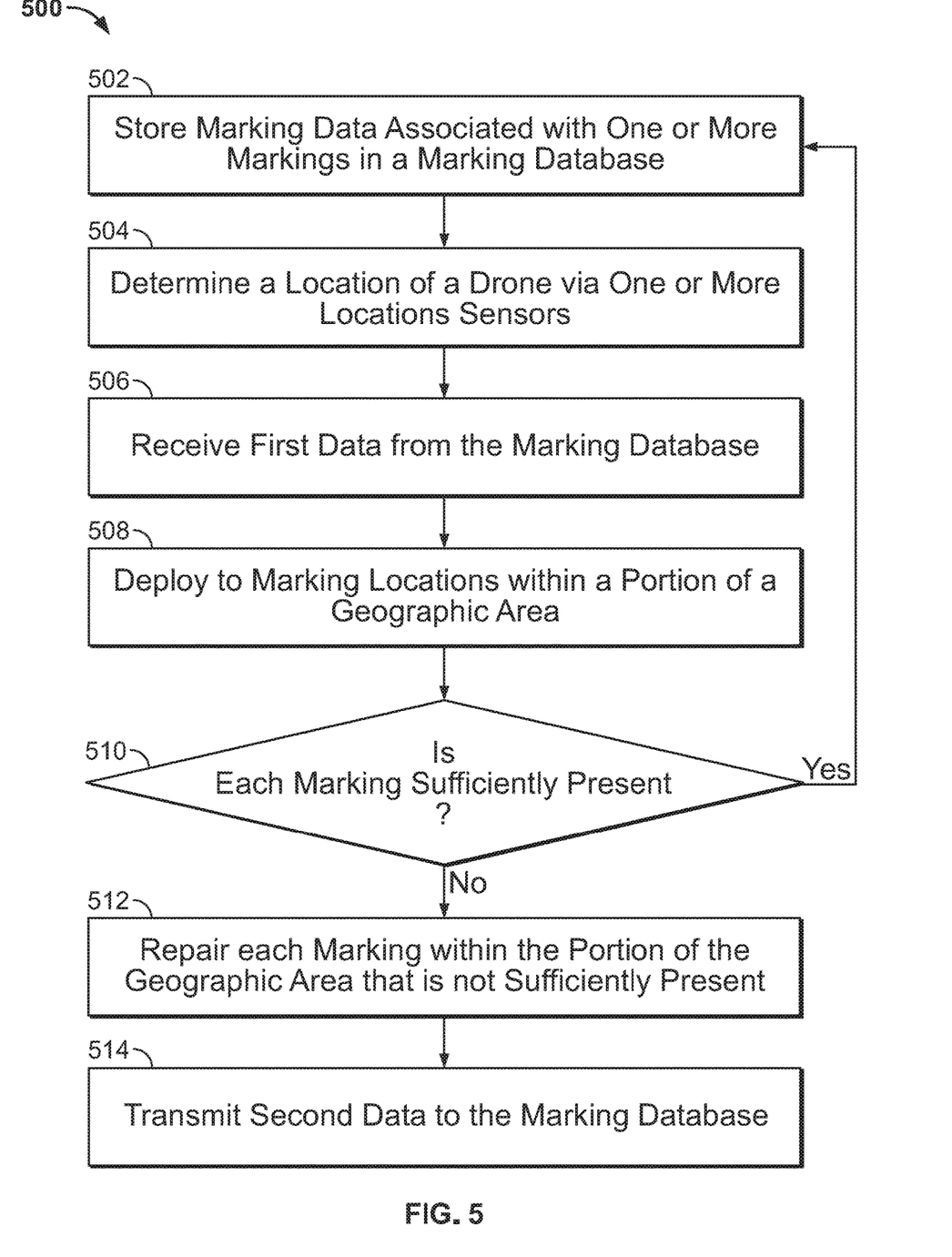
FIG. 5 is a flow diagram of method steps for maintaining markings using the autonomous marking system of FIG. 1.

A process 500 of method steps for maintaining utility markings using autonomous marking system 100 is illustrated in FIG. 5. The process 500 begins by storing marking data associated with one or more markings 108 in a marking database 118 in step 502. The marking data can include one or more marking locations within a geographic area 106 and a type of infrastructure associated with each of the one or more markings 108. For example, marking database 118 can store underground infrastructure data that can be used by drone 102 to identify markings 108. For example, the location data can include the GPS coordinates of location 106. Location 106 may be associated with an underground infrastructure such as a water pipe, a gas pipe, an electrical cable, a fiber optic cable, a communication cable, a liquid pipe, a structure, a tunnel, an electrical unit, or an electronics unit.

Process 500 continues by determining a location of a drone 102 via one or more location sensors in step 504. In one aspect, instead of a drone 102, the apparatus may be a robot, unmanned aerial vehicle (UAV), or autonomous aerial vehicle (AAV). For example, location ID 204 of drone 102 can determine the location 106 of drone 102. Location ID 204 may include a GPS system using coordinates to keep track of the location of drone 102. Location ID 204 may also keep track of the address of the nearest structure to use in combination with the GPS coordinates. In one aspect, location ID 204 may also include an accelerometer, telemetry sensor, radio-frequency sensor, and radio-frequency triangulation sensor. In one aspect, drone 102 includes a data store that stores a portion of the marking database.

Process 500 continues by receiving first data from the marking database 118 in step 506. The first data can includes marking data associated with a portion of the geographic area 106. For example, transceiver 202 of drone 102 can exchange data with server 116 via network 110. The data network can be a wireless data network such as a mobile telephone network, a Wi-Fi network, local area network, wide area network, the Internet, a Bluetooth network, and other wireless network. The mobile telephone network can be implemented using PLMN 114. The Wi-Fi network and/or local area network can be implemented using Wi-Fi 112.

In one aspect, transceiver 202 of drone 102 can exchange data with a ground-penetrating sensor. Ground-penetrating sensors may be used to detect and identify the location 106 and depth of the utility lines. The ground-penetrating sensor may collect underground infrastructure data that can be used by drone 102 to identify markings 108. In some instances, a drone 102 may survey an area using an underground infrastructure sensor and/or ground-penetrating sensor to determine the location and/or depth of underground infrastructure, and apply one or more markings to the surface above such infrastructure via, for example, applicator 104. In other instances, a drone 102 may survey the surface of an area to confirm and/or identify the location of certain underground infrastructure using, for example, sensors 208 to detect existing markings. In yet other instances, a drone 102 may scan for marking and scan for underground infrastructure concurrently. In a further instance, a drone 102 may be directed to particular location by, for example, server 116, sending location data and instructions to the drone 102 to deliver a particular type of payload (e.g., yellow paint associated with a gas line) at that location. Once the payload is delivered, the drone 102 may send data back to server 116 indicating completion of the payload delivery so that a status associated with the underground infrastructure is updated in a marking database. In some configurations, the underground infrastructure scanner may be detached from and/or not connected to the drone 102 but communicatively coupled to the drone 102 via a wireless interface to enable detection, location, and/or depth data to be delivered to the drone 102. The ground-penetrating sensor may include a depth sensor. The ground-penetrating sensor may be detached from or integrated within the drone 102. A detached ground-penetrating sensor may communicate and/or exchange detection data with a drone 102 via a wireless interface either directly via, for example, Bluetooth, Wifi, or another wireless protocol or indirectly via a PLMN network, Wifi, or other wireless network. A detached ground-penetrating sensor and/or detector system may send its detected underground infrastructure data to a server 116 and/or database 118 for subsequent delivery to a drone 102 which, in turn, may be used to direct the drone 102 to underground infrastructure to effect marking on a surface above the underground infrastructure. The detection data and/or underground infrastructure data may include, without limitation, location, time and/or date, depth, type of infrastructure, address, project ID, an infrastructure element ID, survey ID, surveyor ID and/or name, and so on.

Process 500 continues by deploying to marking locations within the portion of the geographic area in step 508. For example, delivery system 212 can include marking sensors configured to scan an area at location 106. The marking sensors 218 may comprise optical sensors, visible light sensors, cameras, infrared sensors, ultraviolet sensors, and/or radiation sensors. For example, sensor 214 may emit an optical signal having a wavelength in the infrared range and measure the reflectance of light from the paint of marking 108. The reflectance will be different based on a pigment in the paint of marking 108. Sensor 214 can identify the specific pigment by comparing the spectrum of the reflectance with stored spectra of known pigments in paint. Once the pigment has been identified, sensor 214 can determine the color of the paint that corresponds to the identified pigment. In one aspect, sensor 214 may capture an image of the area surrounding marking 108. Sensors 214 can calculate the hue and saturation of RGB pixels of the image of the marking 108 and compare the calculations to stored hue and saturation values representing known colors.

Process 500 continues by determining whether each marking within the portion of the geographic area is sufficiently present using one or more marker sensors in step 510. Drone 102 can make the determination by detecting an indicator in paint associated with each of the detected markings 108. For example, the marking material may comprise paint, flags, electronic beacons, and/or marking structures. In one aspect, the marking material may comprise optically-identifiably elements. For example, the paint in payload assembly 210 can include a pigment or compound that is identifiable by a sensor of drone 102. As discussed above in relation to FIG. 2, examples of pigments (and their corresponding colors) include carbon (black), cobalt aluminate (blue), chromium oxide (green), titanium dioxide (white), cobalt phosphate (violet), cadmium sulfide (yellow), cadmium sulfoselenide (orange), and iron oxide (red). Other examples of pigments include antimony trioxide (white), zinc oxide (white), cobalt stannate (blue), lead chromate (yellow), zinc chromate (yellow), and cadmium selenide (red). In one aspect, the paint includes a radioactive isotope such as tritium.

In one aspect, drone 102 determines that a marking is not sufficiently present by determining that a threshold portion of the marking 108 previously set is not present. For example, drone 102 can make the determination by comparing the amount of indicator in the paint to the amount of indicator that would be in the paint if it were sufficiently present. In one aspect, the threshold portion may be greater than or equal to 10, 20, 30, 40, 50, 60, 70, 75, 80, 90, or 100 percent. In another aspect, drone 102 determines that marking 108 is not sufficiently present by determining that a particular segment of the marking previously set is not present. In yet another aspect, drone 102 determines that marking 108 is not sufficiently present by determining that an incorrect indicator is present.

If drone 102 determines that the detected marking is sufficiently present, process 500 restarts and drone 102 is deployed to another portion of the geographic area. Otherwise, if drone 102 determines that the detected marking is not sufficiently present, process 500 continues by repairing each marking within the portion of the geographic area that is determined to not be sufficiently present in step 512. For example, CPU 206 of drone 102 can be configured to receive data from location ID 204, delivery system 212, and transceiver 202. CPU 206 can use the received data to control the delivery of the payload 210 at location 106. For example, CPU 206 may instruct delivery system 212 to open an access to payload 210, allowing a portion of the material of payload 210 to move into applicator 104, if drone 102 is in a position above marking 108. In some aspects, the delivery system 212 includes spray nozzles, spread head, pneumatic dispensers, mechanical dispensers, and/or electronic dispensers. While the examples herein primarily describe delivery of paint, a payload assembly 210 may include, for example, one or more pylons that can be deployed to a location such as a road to redirect traffic or block access to a particular area.

In one aspect, repairing includes replacing marking 108. In another aspect, repairing includes overlaying a portion of the previously set marking 108 including a portion that is currently not present. In another aspect, repairing includes applying a replacement marking over the previously set marking 108. In yet another aspect, repairing includes applying a marking 108 at a location that was not previously applied.

Process 500 finishes by transmitting second data to the marking database in step 514. The second data can indicate each of the markings within the portion of the geographic area that has been repaired. For example, transceiver 202 of drone 102 can exchange data with server 116 via network 110.

In one aspect, the marking database 118 is located remotely from drone 102 and drone 102 receives first data from and send second data to the marking database 118 via a remote server. Drone 102 may send data to the marking database 118 at least one of periodically, in real-time, in near real-time, and in response to a query from the remote server. In another aspect, the marking database 118 is located in drone 102, at a drone-deploying vehicle, in a remote regional location, or at a headquarters location.

In one aspect, the CPU 206 of drone 102 is configured to process the underground infrastructure data received from the ground-penetrating sensor and location data received from location ID 204 and store a table including correlated underground infrastructure and location data in storage 208. In another aspect, CPU 206 may transmit the table to server 116 via network 110. The server 116 may store the table in database 118 for future use by another drone 102.

Figure 6:
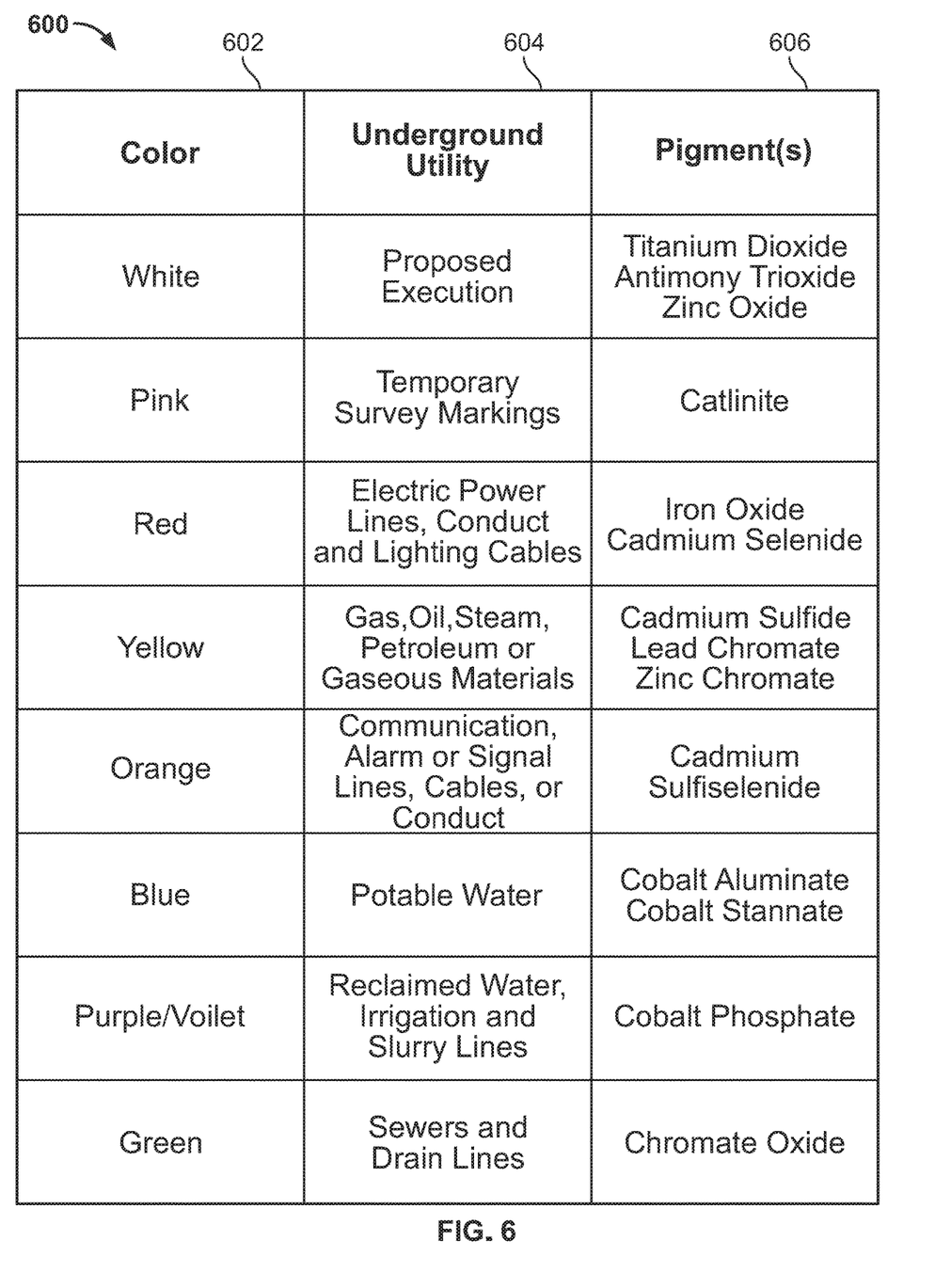
FIG. 6 includes a table showing various marking colors and their corresponding pigments.

FIG. 6 includes an infrastructure table 600 of a marking database that shows various marking colors in column 602, their corresponding infrastructure descriptions in column 604, and their corresponding unique pigment materials and/or reference indicators in column 606. In some configurations, column 606 lists other types of indicators instead of or in addition to the pigments such as, for example, radioactive or chemically reactive materials. The colors in table 600 may correspond to the American Public Works Association (APWA) established a color code that identifies types of underground utility lines. For example, white represents proposed excavation limits or routes, pink represents temporary survey markings or unknown/unidentified facilities, red represents electric power lines, yellow represents gaseous flammable material, orange represented telecommunication cables, blue represents drinking water, purple represents reclaimed water and irrigation lines, and green represents sewers and drain lines. Other colors may represent other underground utility lines.

Figure 7:
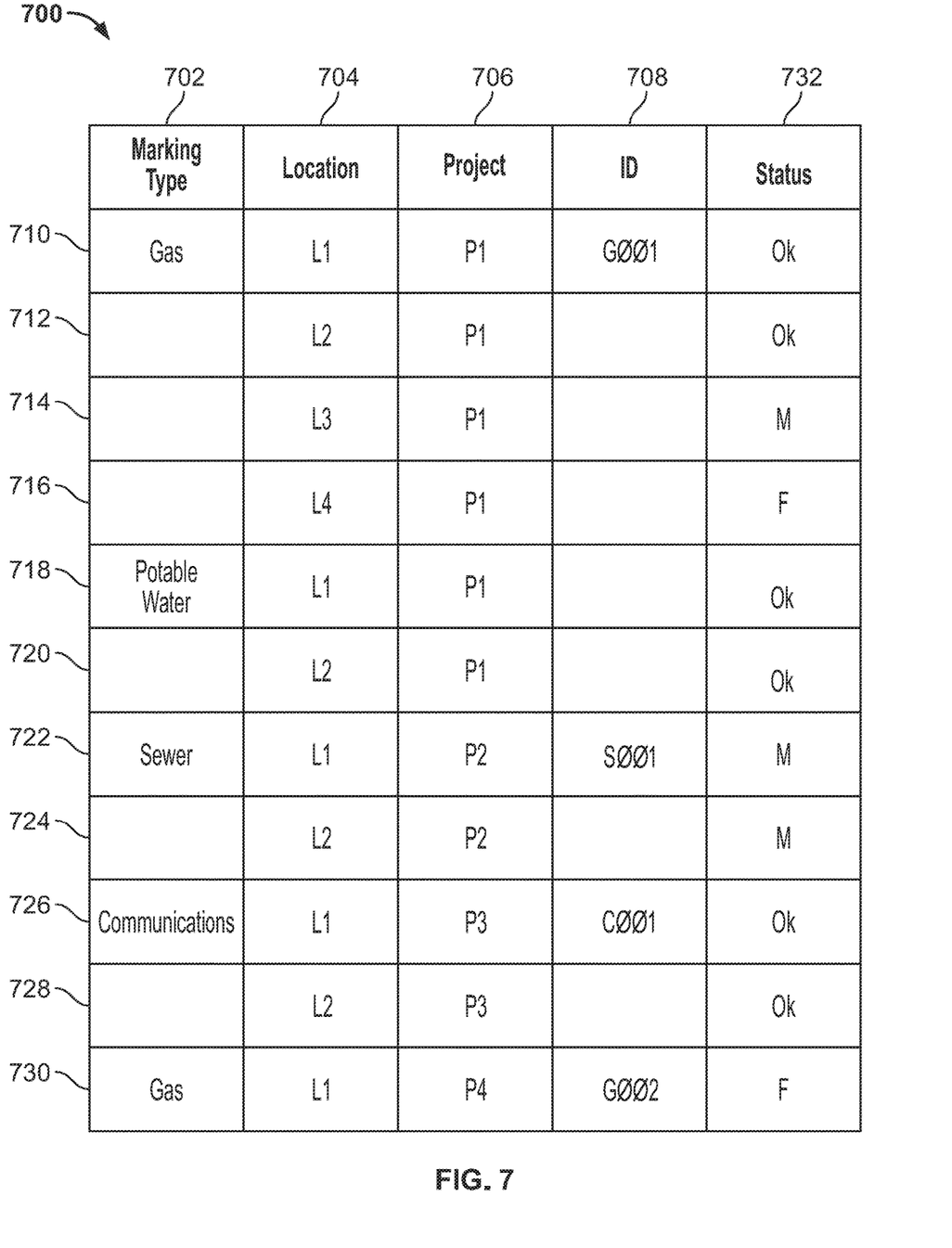
FIG. 7 includes a table correlating markings with corresponding location data and project data.

FIG. 7 includes a table 700 of a markings database that correlates markings in a marking column 702 with corresponding location data in location column 704, project data project data in column 706, and an infrastructure identifier (ID) in column 708. In some implementations, the ID is a unique identifier. The ID may include a type indicator (e.g., "G" for gas or "P" for potable water, and so on). The location identifier, e.g., L1, may include an address, GPS coordinates, coordinates with respect to a reference point, a grid identifier, and the like. The location identifier may include map data including, for example, a two-dimensional (2D) representation showing the location of the underground infrastructure within a particular area. The location identifier may include a three-dimensional (3D) map and/or representation the shows a horizontal geographic area along with a vertical area (i.e., depth). The 3D representation may show the position, path, and/or route of the underground infrastructure through the 3D space delimited by the location identifier, e.g., L1. In some implementations, the location identifier may include a reference point (e.g., GPS coordinates) from which a 2D or 3D space is further delimited.

FIG. 7 shows a table listing multiple underground infrastructure elements. In some implementations, multiple rows 710, 712, 714, and 716 may be associated with a particular infrastructure element such as the gas infrastructure element with an ID of "G001." The G001 gas infrastructure element may be associated with multiple location identifiers L1, L2, L3, and L4. In some configurations, the multiple location identifiers L1, L2, L3, and L4 may be associated with infrastructure element G001 to indicate a beginning and end of an element or a path or route of an element. A project identifier, e.g., P1, may also be associated with an underground infrastructure element (e.g., a gas line). Table 700 may include a status column 732 that indicates a condition and/or status of one or more markings associated with an infrastructure element. For example, infrastructure element G001 has markings at L1 and L2 with a status indicating that the marking are adequate or OK. But, the marking L3 in row 714 has a status of missing ("M"). Also, the marking L4 in row 716 has a status of faded, partial, not sufficiently present, and/or inadequate ("F"). Other status indicators may be assigned to particular infrastructure elements.

Other information or data may be stored and associated with each infrastructure element such as, without limitation, description of element, description of project, operational instructions, regulatory requirements, dimensions of infrastructure elements (e.g., size, diameter, length, and so on), infrastructure element materials (e.g., PVC, aluminum, steel, and so on), time and/or date of installation, time and/or date of expiration of element components, condition of infrastructure element, condition and/or status of infrastructure element markings (i.e., incomplete, faded, incorrect, missing, and so on), handling instructions, data derived from historical infrastructure information, data from historical infrastructure maps, data from regulatory databases, data from utility databases, data from previously detected infrastructure, survey data, and data from real-time detection information. The table 700, or a portion thereof, may be stored in a remote database such as database 118 and/or storage 304 of sever 116. In some implementations, a portion of table 700 is stored in storage 208 of one or more drones 102. A drone 102 may access remote database 118 and/or storage 304 of server 116 via network 110 to access underground infrastructure data including the location one or more of infrastructure elements.

A drone 102 may store a subset of the data of table 700 locally in storage 208 so as to conserver memory while only needing underground infrastructure data associated with a particular project, e.g., P1, or a particular location that the drone 102 is currently working. Once the drone 102 completes maintenance and/or repairs of markings at a particular site, project, and/or location P1, the drone 102 may update table 700 with status information (e.g., "OK" or "M" or "F" if the drone was unable to complete repairs). Once table 700 is updated in remote database 118 and/or storage 304, the drone 102 may deleted the portion of table 700 in its local storage 208 associated with project P1. When a drone 102 is assigned to, for example, project P2, the drone 102 may access database 118 and/or storage 304 to obtain underground infrastructure data associated with project P2, and store the P2 data in a local copy of a portion of table 700 in storage 208.

Figure 8:
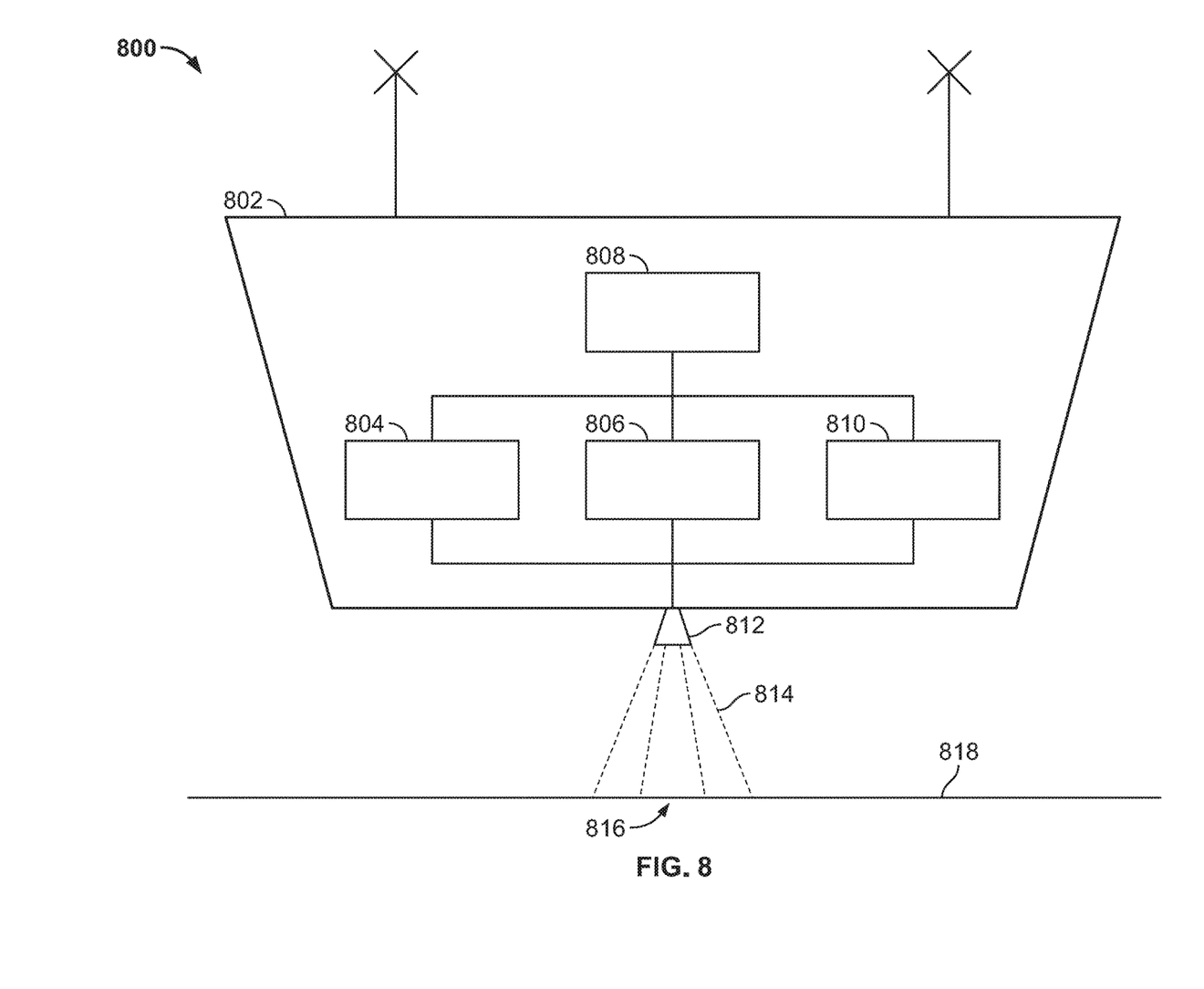
FIG. 8 illustrates a drone spraying a target area with marking material.

FIG. 8 illustrates a marking system 800 including a drone 802 spraying a target area 816 on a surface 818 with marking material 814 via a nozzle and/or applicator 812. The drone 802 may include one or more payload containers and/or assemblies 804, 806, and 810. The drone 802, via a controller such as controller and/or CPU 206, may selectively deploy one or more types of marking material by storing different marking materials in each payload container 804, 806, and 810, and then selecting one of the containers to deliver its payload of marking material to the nozzle 812 to spray the material onto the target area 816. The controller 206 may control one or more electromechanically actuated delivery valves to effect delivery of the selected marking material to the target area 816. For example, payload container 804 may store yellow paint, payload container 806 may store blue paint, and payload container 810 may store green paint. In some implementations, one or more payload containers includes an aerosol can or other type of detachably removable container.

Each payload container 804, 806, and 810 may be independently pressurized. In some implementations, drone 802 may include a pressurizer 808 that is selectively connected to each payload container 804, 806, and 810 when a payload is to be delivered from the selected payload container. When drone 802 detects a gas line (and/or is directed by CPU 206 to a location of a gas line), the controller 206 may open a valve outlet from payload 804 and open nozzle 812, while closing valve outlets from payloads 806 and 810 to deliver the yellow paint to the target area 816. The drone 802, under the control of CPU 206, may move along a path or from a first position to a second position to draw one or more lines on the surface 818 corresponding to a location and/or direction of the underground gas line. The drone 802 may mark a potable water line using the blue paint stored in container 808 by controlling the delivery valves accordingly. The drone 802 may mark a sewer line using the green paint by controlling the delivery valves accordingly. In some configurations, an angle and/or orientation of the nozzle 812 is controlled by controller 206 to enable delivery of markings to a surface that may not be substantially perpendicular to the drone 802. Also, the controller 206 may control delivery of marking material for at least a portion of a marking without having to move the drone 802. Instead, a portion of a marking may be delivered by adjusting an orientation and/or angle of the nozzle 812 with respect to the surface 818 and/or the drone 802. For example, an arrow head of a marking may be drawn on a surface by manipulating the nozzle 812 instead of moving the drone 802.

Figure 9:
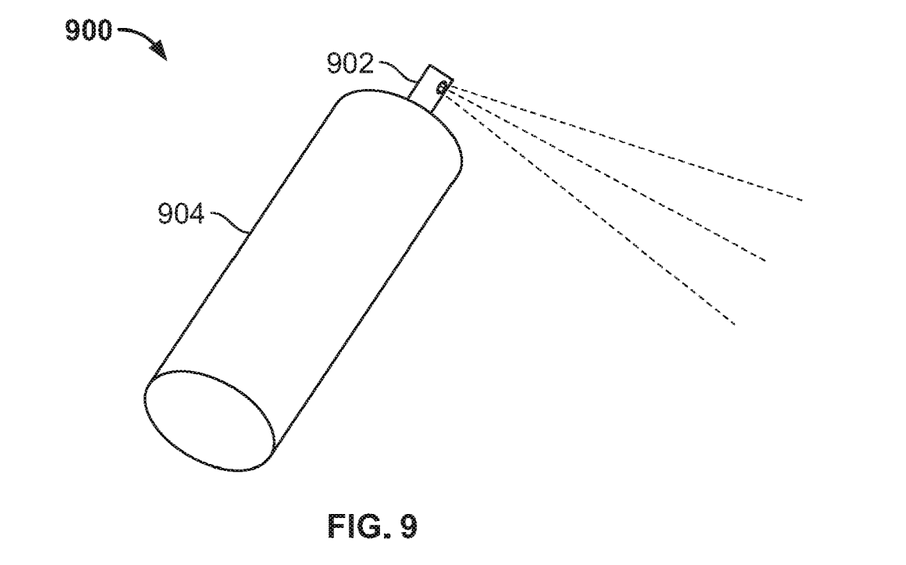
FIG. 9 shows a perspective view of an aerosol can including marking material.

FIG. 9 shows a perspective view of an aerosol can 900 including marking material. The can 900 may include a housing or storage container 904 and a spray nozzle 902. The housing 904 may be pressurized to enable marking material, e.g., paint, to be expelled from the housing 904 when the valve of the nozzle 902 is opened.

Figure 10:
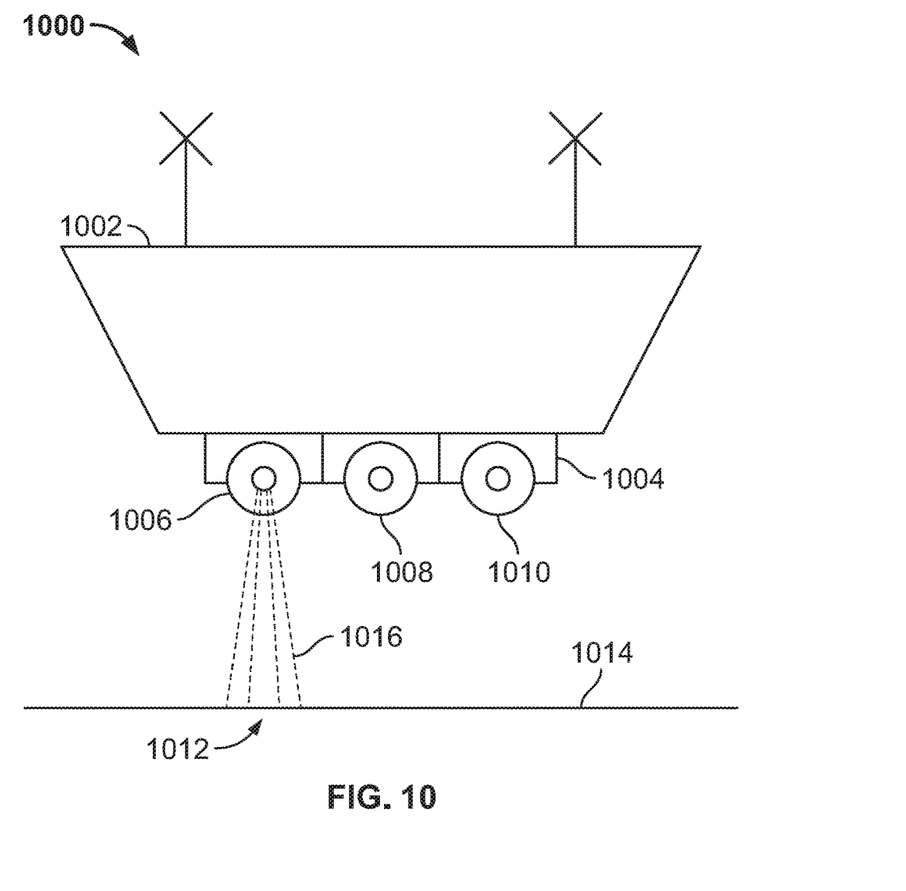
FIG. 10 illustrates a drone deploying a marking to a target area while holding multiple detachably connectable aerosol cans.

FIG. 10 illustrates a marking system 1000 including a drone 1002 deploying marking material 1016 to a target area 1012 on a surface 1014 while holding multiple detachably connectable aerosol cans 1006, 1008, and 1010. In some implementations, the drone 1002 includes a payload assembly 1004 that is configured to detachably hold one or more marking payloads such as, for example, aerosol cans 1006, 1008, and 1010. The payload assembly 1004 may include one or more mechanical, magnetic, electromechanical, and/or electromagnetic connectors that facilitate physical connection of aerosol cans 1006, 1008, and 1010 to the assembly 1004. The payload assembly may include one or more electromechanical switches and/or actuators that are configured to engage the nozzle 902 of an aerosol can 1006, 1008, and 1010 to initiate delivery of marking material 1016 to the target area 1012. In some implementations, the payload assembly 1004 includes one or more receptacles configured to engage with an aerosol tube extending from an aerosol can. For example, in some configurations, the nozzle 902 may be removed from an aerosol can 1006, 1008, and 1010 so that the remaining spray tube can engage with a female receptacle of the valve assembly 1004. The valve assembly 1004 may include one or more control valves that are electromechanically controlled by controller 206 to selectively initiate marking delivery to a target area 1012.

Other objects, advantages and implementations of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A marking maintenance system comprising:
   a marking database arranged to store marking data associated with one or more underground infrastructure markings arranged to identify the location of one or more underground infrastructure elements, the marking data including one or more underground infrastructure marking locations within a geographic area and including a type of infrastructure associated with each of the one or more underground infrastructure markings, the marking database including an infrastructure type table correlating each color of a set of colors to a different type of infrastructure, the marking database communicatively coupled to a data network; and a drone communicatively coupled to the data network, wherein the drone is configured to:
determine the location of the drone via one or more location sensors; receive first data from the marking database, wherein the first data includes marking data associated with a portion of the geographic area;
deploy to each underground infrastructure marking location within the portion of the geographic area;
determine whether each underground infrastructure marking within the portion of the geographic area is sufficiently present using one or more marker sensors, wherein determining includes detecting an indicator in paint associated with each of the detected underground infrastructure markings, wherein each of the detected indicators includes a color of the set of colors listed in the infrastructure type table that corresponds to the type of infrastructure;
repair each underground infrastructure marking within the portion of the geographic area that is determined to not be sufficiently present by applying additional paint including the indicator; and
transmit second data to the marking database, wherein the second data indicates each of the underground infrastructure markings within the portion of the geographic area that has been repaired.

2. The system of claim 1, wherein the drone determines that an underground infrastructure marking is not sufficiently present by determining that a threshold portion of the marking previously set is not present.

3. The system of claim 2, wherein the threshold portion may be one of greater than or equal to 10, 20, 30, 40, 50, 60, 70, 75, 80, 90, and 100 percent.

4. The system of claim 1, wherein the drone is configured to determine that an underground infrastructure marking is not sufficiently present by determining that a particular segment of the underground infrastructure marking previously set is not present.

5. The system of claim 1, wherein the drone is configured to determine that an underground infrastructure marking is not sufficiently present by determining that an incorrect indicator is present.

6. The system of claim 1, wherein the drone includes a camera and is configured to capture at least one image of a underground infrastructure marking within the portion of the geographic area.

7. The system of claim 1, wherein repairing includes replacing the underground infrastructure marking.

8. The system of claim 1, wherein repairing includes overlaying a portion of the previously set underground infrastructure marking including a portion that is currently not present.

9. The system of claim 1, wherein repairing includes applying a replacement underground infrastructure marking over the previously set marking.

10. The system of claim 1, wherein repairing includes applying a marking at a location that was not previously applied.

11. The system of claim 1, wherein the drone includes a data store that stores a portion of the marking database.

12. The system of claim 11, wherein:
the marking database is located remotely from the drone, and
the drone is configured to receive first data from and send second data to the marking database via a remote server.

13. The system of claim 12, wherein the drone is configured to send data to the marking database at least one of periodically, in real-time, in near real-time, and in response to a query from the remote server.

14. The system of claim 1, wherein the indicator includes at least one of a pigment, a radioactive material, light sensitive material, and a chemically reactive material.

15. The system of claim 1, wherein the marking database includes an infrastructure table correlating each reference indicator with a type of infrastructure.

16. The system of claim 1, wherein the drone is configured to determine the type of infrastructure associated with a detected underground infrastructure marking by comparing the detected indicator with the infrastructure table to identify a match between a reference indicator and the detected indicator.

17. The system of claim 1, wherein the drone is unmanned aerial vehicle (UAV) or autonomous aerial vehicle (AAV).

18. The system of claim 1, wherein the marking database is located at least at one of in the drone, at a drone-deploying vehicle, in a remote regional location, and at a headquarters location.

19. A autonomous marking maintenance apparatus comprising:
a transceiver communicatively coupled to a data network, the transceiver arranged to receive first data from a marking database, wherein the first data includes marking data associated with a portion of a geographic area, the marking database being arranged to store marking data associated with one or more underground infrastructure markings, the marking data including one or more underground infrastructure marking locations within the geographic area and including a type of infrastructure associated with each of the one or more markings, the marking database including an infrastructure type table correlating each color of a set of colors to a different type of infrastructure;
a location sensor arranged to determine a location of the apparatus;
a propulsion system arranged to enable the apparatus to deploy to each marking location within the portion of the geographic area;
one or more marking sensors arranged to scan an area in proximity to the apparatus; and
a processor arranged to i) determine whether each underground infrastructure marking within the portion of the geographic area is sufficiently present based on sensor data received from the one or more marking sensors, wherein determining includes detecting an indicator in paint associated with each of the detected markings and wherein each of the detected indicators includes a color of the set of colors listed in the infrastructure type table that corresponds to the type of infrastructure; ii) control repair of each underground infrastructure marking within the portion of the geographic area that is determined to not be sufficiently present, wherein the repair includes applying additional paint including the indicator; and iii) coordinate with the transceiver to transmit second data to the marking database, wherein the second data indicates each of the underground infrastructure markings within the portion of the geographic area that has been repaired.

20. A method of performing marking maintenance comprising:

providing a marking database arranged to store marking data associated with one or more underground infrastructure markings arranged to identify the location of one or more underground infrastructure elements, the marking data including one or more underground infrastructure marking locations within a geographic area and including a type of infrastructure associated with each of the one or more underground infrastructure marking, the marking database communicatively coupled to a data network, the marking database including an infrastructure type table correlating each color of a set of colors to a different type of infrastructure;

communicatively coupling a drone to the data network;

determining a location of the drone via one or more location sensors;

receiving first data from the marking database, wherein the first data includes marking data associated with a portion of the geographic area;

deploying the drone to each underground infrastructure marking location within the portion of the geographic area;

determining whether each underground infrastructure marking within the portion of the geographic area is sufficiently present using one or more marker sensors, wherein determining includes detecting an indicator in paint associated with each of the detected underground infrastructure markings, wherein each of the detected indicators includes a color of the set of colors listed in the infrastructure type table that corresponds to the type of infrastructure;

repairing each underground infrastructure marking within the portion of the geographic area that is determined to not be sufficiently present by applying additional paint including the indicator; and transmitting second data to the marking database, wherein the second data indicates each of the underground infrastructure markings within the portion of the geographic area that has been repaired.

\* \* \* \* \*